United States Patent

[11] 3,595,500

[72] Inventor Marcel Kretz
7, Square de Port-Royal, Paris 13e, France
[21] Appl. No. 844,964
[22] Filed July 25, 1969
[23] Division of Ser. No. 645,771, June 13, 1967, Pat. No. 3,481,560
[45] Patented July 27, 1971
[32] Priority June 20, 1966, May 12, 1967
[33] France
[31] 66,166 and 106,281

[54] JET FLAP CONTROLLING MEANS
5 Claims, 6 Drawing Figs.
[52] U.S. Cl. .................................................. 244/42
[51] Int. Cl. .................................................. B64c 21/04
[50] Field of Search .......................................... 244/42, 42.42, 42.41, 42.46, 41

[56] References Cited
UNITED STATES PATENTS
3,259,341  7/1966  Steidl .......................... 244/42 (X)

Primary Examiner—Milton Buchler
Assistant Examiner—Carl A. Rutledge
Attorneys—Robert E. Burns and Emmanuel J. Lobato ABSTRACT: The invention resides basically in jet flap control means in which an aerofoil having a jet slit trailing edge is provided with a flexible deflecting flap arranged along the lower lip of said slit and extending rearwardly therefrom, control means adapted to impart upward and downward flexure of said flap having a sandwiched structure including thin metal sheets with interposed elastomeric material between them.

3,595,500

JET FLAP CONTROLLING MEANS

This is a divisional application of applicant's copending application Ser. No. 645,771 filed June 13, 1967 now U.S. Pat. No. 3,481,560.

SUMMARY OF INVENTION

The jet flap control means, according to the invention, comprises positive control mechanism operative on the trailing edge of a flexible deflector flap element, in such a manner that differentiation occurs between upward and downward movement, so that the profile formed by flexure is adapted respectively to the aerodynamic requirements of positive deflection of the jet stream (when the flap acts like the positive face of a blade or vane and the working surface of the flap is concave) and the Coandalike deflection due to boundary layer adherence to the surface (when the working surface is convex); it being established that curvature of different profile is required in the two respective axes. The invention includes constructional features aimed at the practical application of the control so provided.

More specifically, the present invention relates to a deflector arrangement for a fluid jet having mainly the object of modifying the direction of flow of fluid from a jet slit provided at the trailing edge of an aerodynamic or hydrodynamic lifting or propulsive element with a view to controlling the forces acting on the element, for example an airplane wing or a helicopter blade of so-called "blown" type, the arrangement being of the kind also known as a "jet flap." The arrangement according to the invention is, however, capable of numerous other applications, for example as a thrust-reverser of the jet of a jet-reaction device or a marine propulsive duct and analagously.

There are previously known deflector flaps of this kind which are constituted by a flexible sheet fixed by one of its edges at one of the lips of the slit, for example the lower lip, which in its neutral position is in a plane parallel to the plane of symmetry of the jet and which by pneumatic or mechanical control means, is flexed in a curvature appropriate to the desired deflection of the jet. Realization of such control at present presents difficulties; a pneumatic control, for example, usually involves some kind of inflatable vessel as an actuator to cause the deformation of the flexible sheet, and it is not practicable with a single such control, to achieve jet deflections in the two opposed senses (up and down) in respect of the plane of symmetry of the jet.

Further, the profile taken up by the flexible sheet results in equilibrium between the control forces and forces exerted on the sheet by the jet itself, together with such other forces which vary according to the conditions of use, in respect of which there may not be a unique relation between the control and the deflection. Sheetlike flaps which are insensitive to external forces are difficult to realize in practice, not only for the reason stated above, but also by reason of the fact that the phenomena to which the sheet is subjected may be very different according to whether the flap is flexed to deviate the jet upwards or downwards.

If the jet is to be deflected downwards to augment the lift afforded by the wing of an airplane or a rotor blade of a helicopter, the flexible sheet being fixed to the lower lip of the jet slit is flexed in a manner to present a convex surface upwards, the jet stream following the profile of the sheet by the effect known as the "Coanda" effect; in order that there shall not be separation of the stream it is necessary that any radius of curvature of the flexed flap, which is subjected to positive pressure force on its under face and a lower pressure on its upper face, must not be less than a value approximately equal to 10 times the height of the jet slit. When the sheet is flexed in a manner to present upward concavity so as to deviate the emerging jet upwards, the flexible sheet deviates the jet positively, in the manner of a blade or vane, and in this case the radius of curvature of the flexed sheet may be considerably less, for example equal to about twice the height of the jet slit.

The object of the present invention is a flexible flap structure adapted to meet the above requirements and capable of differentiated upward and downward flexure when associated with mechanical control means operatively connected with the trailing edge of said flexible flap.

With this and other object in view, the flexible flap according to the invention is mainly characterized by a sandwiched structure comprising thin metal sheets with interposed elastomeric material between them.

According to a preferred embodiment, the said flexible flap according to the invention comprises a bracket arranged on the lower lip of the slit and extending rearwardly therefrom, a profiled member arranged on the trailing edge of the flap, a control mechanism for deflecting said flap and operatively connected with said profiled member, wherein only one of the metal sheets of the sandwiched structure forming the flap and arranged on the upper surface thereof is rigidly secured at its forward edge to the said bracket and at its trailing edge to said profiled member, whereas a strip of elastomer is provided between the metal sheet forming the opposed surface of the flap and said bracket and profiled member to allow displacements of said sheet with respect to said bracket and profiled member during the deflections of the flap.

By way of example, there have been described below and represented by drawings examples of the invention and its basis.

Figure 5:
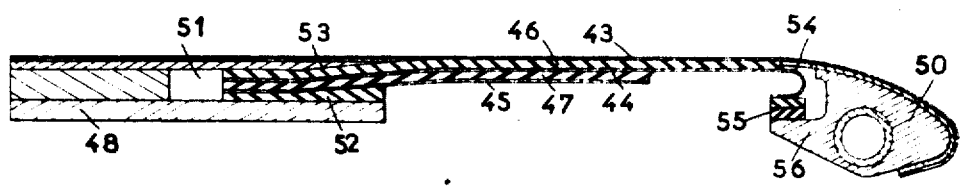
Figure 6:
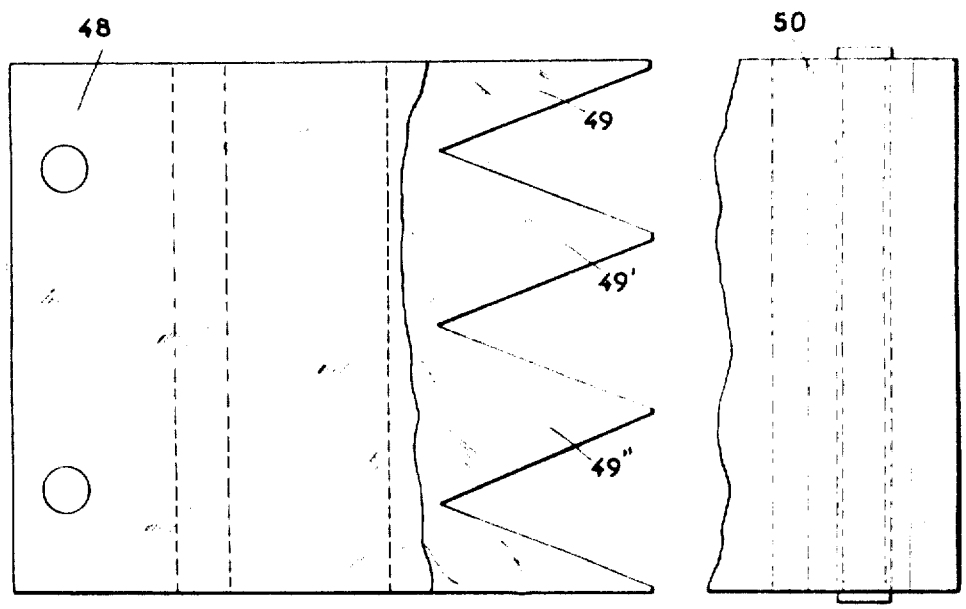

FIGS. 5 and 6 respectively represent a sectional elevation and an underneath plan view of a third embodiment of the flap structure.

Figure 1:
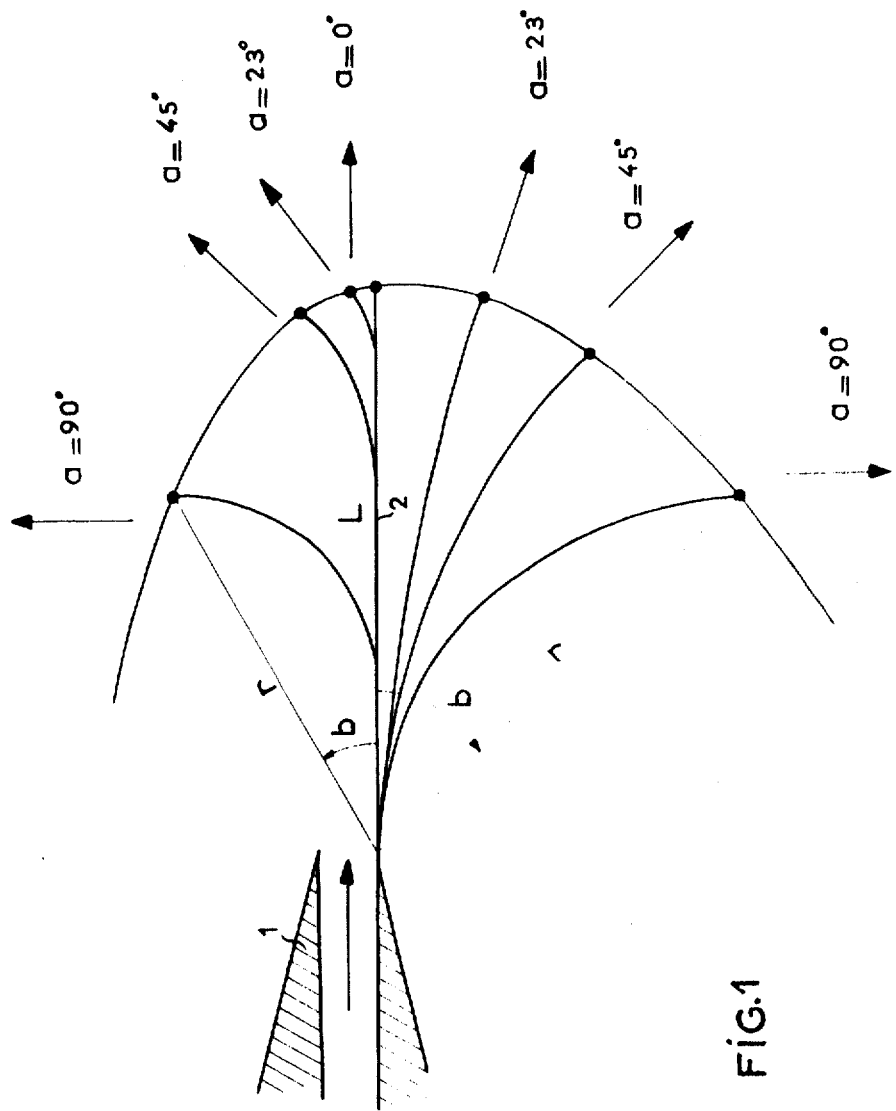
FIG. 1 is a diagram representing various possible flexural deformations of a flap-jet deflector in the form of a flexible sheet.

As shown in FIG. 1, the arrangement comprises a jet slit 1 on the lower edge or lip of which is fixed a flexible sheet 2 of a chord dimension L, which may be constituted, in the spanwise sense of the jet, by several separate elements each having its individual control. For the reasons explained above, should the jet be deflected downwards and the sheet 2 be flexed to present a convexity upwards (see lower part of FIG. 1), the flexible sheet should have uniform curvature. If $a$ is the angle of deflection of the jet, $r$ the length of the vector radius, i.e., the straight line connecting the attachment of the leading edge of the sheet 2 to the trailing edge of the sheet 2, the best conditions to obtain laminar adhesion of the stream will be realized when the angle $b$ of the radius is approximately equal to half the angle of deflection $a$: i.e.:

$$b = 1/2\, a$$

The variation of the vector radius as a function of the angle $a$ changes according to a law of the second degree capable of being expressed by the relation:

$$r/L = 1 - ka^2$$

$k$ being a parameter depending on the dimensional characteristics of the arrangement.

In the case of upward deflection, wherein the flexible sheet acts as a blade, it presents a surface which is concave upwards and it is subjected to the positive pressure of the jet. In this case, the radius of flexed curvature is not uniform, because due to the effect of the effective pressure, part of the sheet 2 remains plane and the flexure increases in radius with the angle of deflection. It therefore results that the angle of the vector radius will vary more quickly as a function of the deflection angle than in the case of downward deflection, for preference following the relations:

$$b = 1/5\, a$$

whilst the variations of the length of the vector radius in upward deflection as a function of the angle $a$ will be less than in the case of the downward deflection and will obey a cubic law given approximately by the relation:

$$r/L = 1 - k'a^3$$

It should be noted that the above relations are empirical and are given by way of indication only of the magnitude of the important factors which may be applied in practice between the values of $r$ and $b$ as a function of the angle of deflection $a$ in the concept of the asymmetric control of the trailing edge of the flexible flap element according to the invention.

Figure 2:
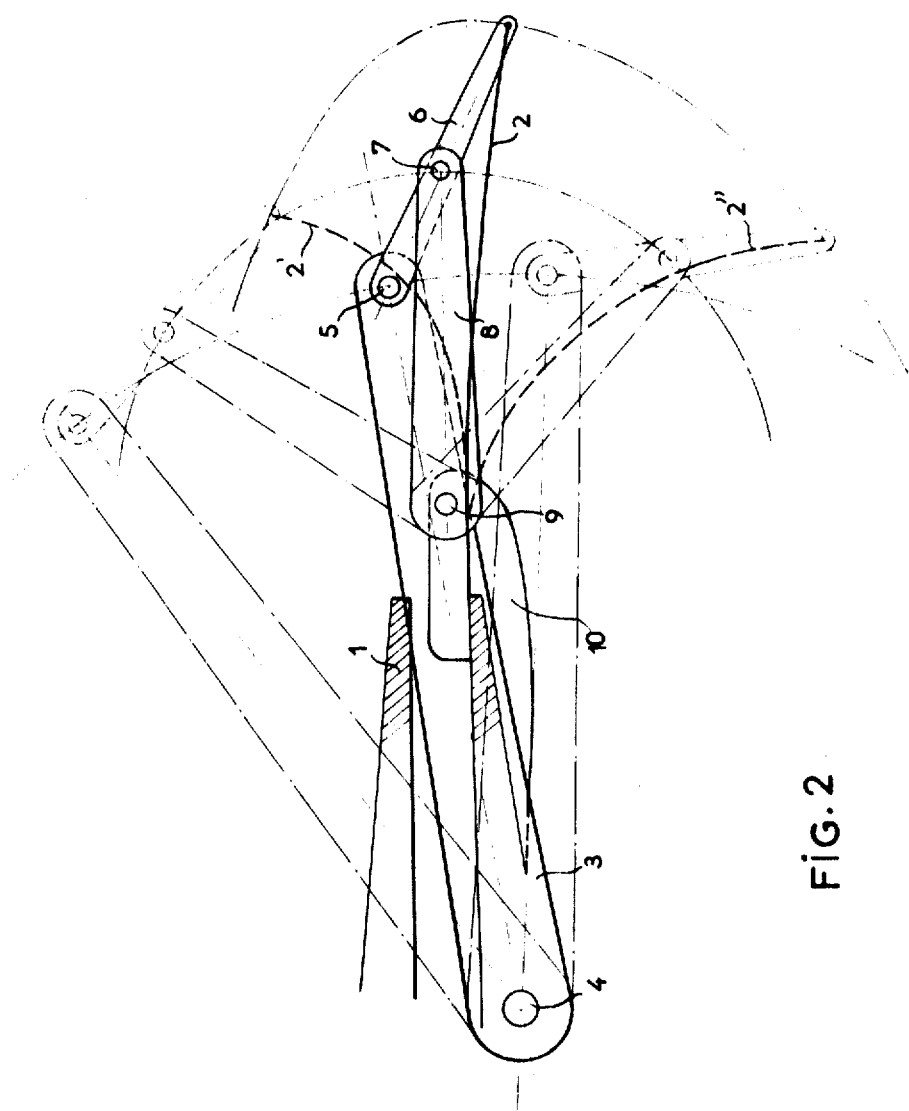
FIG. 2 is a schematic view in sectional elevation of control mechanism applicable to achieve the flexures of FIG. 1.

FIG. 2 represents a form of realization of such a control; on each lateral (spanwise) margin of the flexible sheet 2 or of an element thereof is mounted a mechanism comprising a first lever 3 hinged on a spindle 4 borne on the lower face of the aerofoil which is provided with the jet slit 1, the spindle 4 being entrained for rotation by the actuator of the control. At the rear extremity 5 of this lever 3 is articulated another lever 6 on the extremity of which is fixed the trailing edge of the flap element 2. At 7 of the lever 6, approximately in the middle of its length, is articulated a connecting link 8, the other (forward) end of which is pivoted at an axis 9 situated aft of the jet slit on a bracket 10 fixed to the aerofoil having the jet slit 1 and to which the flexible sheet 2 is secured as will be explained hereafter. The axis at 9 is situated approximately in the plane of symmetry of the jet stream.

The lengths of the levers 3, 6 and of the connecting link 8, as also the position of these parts in the neutral deflection position, are determined so as to obtain asymmetrical variations of curvature as shown in FIG. 1. It is to be noted that with this mechanism for the approximately normal or neutral position of deflection substantially in the position representing in full line in FIG. 2, the sheet 2 is flexed into this position. There have been shown in broken line two positions 2', 2'', of the flexed sheet 2, respectively upwards and downwards, which show the geometric effects of the control mechanism above described. These are such as to provide the flexures of the sheet 2 in accordance with the diagram of FIG. 1.

The jet flap which has been described affords jet deflection downwards extending to 90° and advantageously an upward deviation greater than 90° which makes it available as a thrust-reverser.

It is observed that the control mechanism allows use of the flap in nonpowered flight; thus, in the case of engine failure or compressor failure and, therefore, absence of the jet, the arrangement may then function as a classical flap of high curvature. The flexures of the sheet 2 which may be desirable in these special circumstances not being the same as in the case of operation as a jet flap, the invention may provide a control actuation arrangement with double reduction.

FIG. 3 to 6 of the drawing show a sandwiched flap structure comprising a plurality of thin metal sheets with a layer of elastomeric materials interposed between said metal sheets and means for connecting said flap structure with the lower lip of the jet slit and with the control means in order to allow the flap to undergo suitable upward and downward flexures.

Such a sandwiched flap structure is directly fixed by a single metal sheet, for example its upper sheet, both to the lip of the jet slit and to the profiled element forming the trailing edge operated by the control mechanism.

This disposition permits displacement of the extremities of the sheets, relative to their mutual support, and contributes to achieving the desired curvature of the flap during its flexures due to the fact that the bending of the individual sheets do not conflict.

Figure 3:
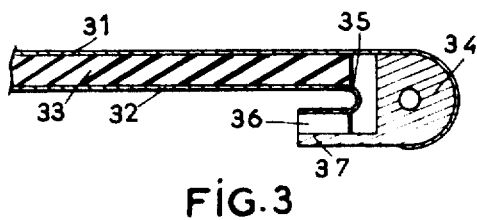
FIG. 3 represents in sectional elevation of a first embodiment of the flexible flap according to the invention.
Figure 4:
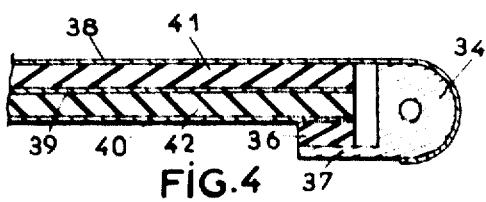
FIG. 4 represents in sectional elevation a second embodiment of the flexible flap.

In FIG. 3, the flexible flap is constituted by two flexible steel sheets 31 and 32, separated by a layer of rubber 33, stuck to the two steel sheets. This assembly is fixed to the trailing edge part 34 in such manner that upon flexure of the flap relative movement may occur between the two sheets so as to take account of the differences of curvature between the external sheet situated on the convex side and the internal sheet situated on the concave side of the flap. To this effect only the upper sheet 31 is directly fixed, for example, by soldering, to the part 34 around which it is folded so as to increase the area of soldering, the layer 33 of rubber terminating short of the part 34. The lower sheet 32 presents a rearward margin 35 folded back upon itself and fixed by adhesive through the intermediary of an elongated strip of rubber 36 on an edge 37 prolonging the lower part of the trailing edge part 34. In this manner, the rubber strip 36 and the folded back part 35 of the sheet take up the differences of flexure of the sheets 31 and 32 during their flexion. In the example of FIG. 4, the flap is constituted by three superimposed sheets 38, 39 and 40, separated one from the other by two layers of rubber 41, 42. The upper sheet 38 is fixed with the part 34 in the same manner as in FIG. 3, whilst the lower sheet 40 is fixed to the edge 37 of the part 34 also by adhesive with interposition of the rubber strip 36, but without being folded back upon itself. It is understood that these two methods of fixing may be combined, that of FIG. 4 being, for example, used to fix the flap to the aerofoil, and that of FIG. 5 for fixing to the part forming the trailing edge of the flap, notably when the lower sheet 40 does not fully extend over the chord of the flap.

FIGS. 5 and 6 represent an embodiment using such a combination of the two fixing methods described above. The deformable flap represented by these FIGS. comprises three flexible steel sheets 43, 44 and 45, separated by layers of adherent rubber 46, 47, the lower sheet 45 not extending over the whole chord of the flap from the support 48 provided by the aerofoil.

This lower sheet 45 presents at its aft margin an outline of saw tooth pattern 49, 49', 49'', either in the form of isosceles or equilateral triangles, this arrangement reinforcing the structure of the flap in the region of its attachment to the aerofoil and improving the progressive effect of the curvature during flexure of the flap in both up and down senses.

The upper sheet 43 is fixed directly by soldering on the upper surface of the aerofoil attachment 48 corresponding to the lower lip of the aerofoil or to bracket 10 of FIG. 2, and on the profiled trailing edge part 50, around which this sheet is folded. The two other sheets 44, 45 are inserted with the layers of rubber 46, 47 interposed between them in a longitudinal (spanwise) groove 51 provided in the attachment 48, a third sheet of rubber 52 being interposed between the lower sheet 45 and the lower face of the groove 51 of the attachment 48. The upper face of this groove is tapered as shown at 53 to facilitate the insertion of the flexible structure. As in FIG. 6, the central sheet 44 is folded back upon itself lengthwise of its trailing margin at 54 and fixed by adhesive, with the interposition of a rubber strip 55, on the upper face of the edge 56 which is rigid with the part 50.

What I claim is:

1. A fluid jet deflecting device for an aerofoil, particularly applicable to a fixed aircraft wing and to helicopter blades of the blown type, having a nozzle in the form of a slit at its trailing edge and a flexible deflector flap arranged along the lower lip of said slit and extending rearwardly therefrom, mechanical control means operatively connected with the trailing edge of said flexible flap to provide upward and downward flexure thereof, said flexible flap having a sandwiched structure and comprising thin metal sheets with interposed elastomeric material between them.

2. A fluid jet deflecting device for an aerofoil, particularly applicable to a fixed aircraft wing and to helicopter blades of the blown type having a nozzle in the form of a slit at its trailing edge and a flexible deflector flap arranged along the lower lip of said slit and extending rearwardly therefrom, a profiled member arranged on the trailing edge of the flap, a control mechanism for deflecting said flap operatively connected with said profiled member, said flexible flap having a sandwiched structure and comprising thin metal sheets with interposed elastomeric materials between them, and means for rigidly securing only one metal sheet of said structure to the jet slit and to the profiled member respectively.

3. A fluid jet deflecting device according to claim 1, comprising a bracket arranged on the lower lip of the slit and extending rearwardly therefrom, a profiled member arranged on the trailing edge of the flap, a control mechanism for deflecting said flap and operatively connected with said profiled member, wherein only one of the metal sheets of the sandwiched structure forming the flap and arranged on the upper surface thereof is rigidly secured at its forward edge to the said bracket and at its trailing edge to said profiled member, whereas a strip of elastomer is provided between the metal sheet forming the opposed surface of the flap and said bracket and profiled member to allow displacements of said sheet with respect to said bracket and profiled member during the deflections of the flap.

4. A fluid jet device according to claim 1, comprising a bracket arranged on the lower lip of the slit, extending rearwardly therefrom and provided with a longitudinal groove on its rear edge, and a trailing profiled member having a groove arranged on its forward edge, a control mechanism operatively connected to said profiled trailing member, the flexible flap comprising a first upper metal sheet rigidly secured to the upper surface of said bracket and of said trailing member, a second metal sheet and a layer of elastomeric material interposed between said first and second metal sheets, a third metal sheet and a second layer of elastomeric material sandwiched between said second metal sheet and a said third metal sheet forming the lower surface of the flap and provided along its lower forward and rear edge with a longitudinal strip of elastomeric material, the forward and rear edges of the assembly formed by said second and third metal sheets, said first and second elastomeric layers and said strip of elastomeric material being inserted within the grooves of said bracket and of said profiled trailing member respectively.

5. A fluid jet device according to claim 1, comprising a bracket arranged on the lower lip of the slit, extending rearwardly therefrom and provided with a longitudinal groove on its rear edge, and a trailing profiled member having a groove arranged on its forward edge, a control mechanism operatively connected to said profiled trailing member, the flexible flap comprising a first upper metal sheet rigidly connected to the upper surface of said bracket and of said trailing member, a second metal sheet and a layer of elastomeric material interposed between said first and second metal sheets, a third metal sheet having a smaller width than the first and second sheets and being provided at its rear edge with teeth having the shape of isosceles triangles, a longitudinal strip of elastomeric material provided along the lower forward edge of said metal sheet, the forward edge of the assembly formed by the first and second elastomeric layers, by the second and third metal sheets and by the elastomeric strip being inserted into the groove of said bracket, whereas the rear edge of the second metal sheet is folded back upon itself, provided on the lower face of the bent part with a strip of elastomeric material and inserted in the groove of said profiled trailing member.